United States Patent
Nishizaki et al.

[11] Patent Number: 6,079,513
[45] Date of Patent: Jun. 27, 2000

[54] STEERING APPARATUS FOR VEHICLE

[75] Inventors: Katsutoshi Nishizaki, Nabari; Shiro Nakano, Chihaya akasaka-mura; Hiroshi Kawaguchi, Mishima, all of Japan

[73] Assignees: Koyo Seiko Co., LTD, Osaka; Toyota Jidosha Kabushiki Kaisha, Aichi, both of Japan

[21] Appl. No.: 09/022,923

[22] Filed: Feb. 12, 1998

[30] Foreign Application Priority Data

Feb. 12, 1997 [JP] Japan ................................. 9-028078

[51] Int. Cl.[7] .......................... B62D 5/00; B62D 5/06
[52] U.S. Cl. ........................ 180/402; 701/41; 701/42
[58] Field of Search .................................. 180/402, 403, 180/445; 701/42, 41

[56] References Cited

U.S. PATENT DOCUMENTS

| | | | |
|---|---|---|---|
| 4,741,409 | 5/1988 | Westercamp et al. | 180/79.1 |
| 4,860,844 | 8/1989 | O'Neil | 180/402 |
| 4,865,144 | 9/1989 | North | 180/402 |
| 4,984,646 | 1/1991 | Sano et al. | 180/402 |
| 5,097,917 | 3/1992 | Serizawa et al. | 180/402 |
| 5,201,380 | 4/1993 | Callahan | 180/403 |
| 5,251,135 | 10/1993 | Serizawa et al. | 701/42 |
| 5,327,986 | 7/1994 | Saita | 180/79.1 |
| 5,347,458 | 9/1994 | Serizawa et al. | 701/41 |
| 5,828,972 | 10/1998 | Asanuma et al. | 701/41 |
| 5,845,222 | 12/1998 | Yamamoto et al. | 701/42 |
| 5,896,942 | 4/1999 | Bohner et al. | 180/402 |
| 5,908,457 | 6/1999 | Higashira et al. | 180/402 |

FOREIGN PATENT DOCUMENTS

| | | |
|---|---|---|
| 522 555 | 1/1993 | European Pat. Off. . |
| 531 962 | 3/1993 | European Pat. Off. . |
| 42 32 256 | 4/1993 | Germany . |
| 4-133861 | 5/1992 | Japan . |
| 7-186983 | 7/1995 | Japan . |
| 2 259 892 | 3/1993 | United Kingdom . |

*Primary Examiner*—Brian L. Johnson
*Assistant Examiner*—Michael Britton
*Attorney, Agent, or Firm*—Darby & Darby

[57] ABSTRACT

A steering apparatus for a vehicle comprising a calculating means for calculating a target value for the reaction force torque on the basis of a self-aligning torque term which is based on a detected value of a vehicle speed and a detected value of an actual moved position of a steering mechanism, an elastic resistance torque term which is proportional to a deviation between a detected value of the steering operating angle of a steering operating means mechanically not connected to the steering mechanism and a detected value of the actual moved position, and an inertial resistance torque term which is proportional to a time varying amount of the deviation, and the reaction force of the steering operating means is controlled by driving a reaction force motor on the basis of the calculated target value.

3 Claims, 7 Drawing Sheets

STEERING APPARATUS FOR VEHICLE

BACKGROUND OF THE INVENTION

The present invention relates to a steering apparatus for a vehicle for directing steerable wheels in response to operations of a driver by means of a steering mechanism which is not mechanically connected to a steering operating means that directs the steerable wheels.

Steering of a vehicle is performed by transmitting operations of a steering operating means, such as a steering wheel, arranged inside a vehicle chamber (generally through a rotating operation of the steering wheel) to a steering mechanism arranged outside the vehicle chamber for directing steerable wheels for steering.

Various types of steering mechanisms such as ball-screw type or rack-and-pinion type are practically used for vehicles. For instance, a rack-and-pinion type steering mechanism is arranged so as to transmit sliding in longitudinal axial directions of a rack shaft which is arranged so as to extend from side to side in a front portion of a vehicle body to knuckle arms attached to both front steerable wheels via tie rods. In this mechanism, a pinion fit into a tip portion of a rotating shaft of a steering wheel (steering column) extending to outside the vehicle chamber is engaged with a rack gear formed in a middle portion of the rack shaft, and rotation of the steering wheel is converted to sliding movement of the rack shaft in a longitudinal direction, whereby steering is performed in accordance with the rotating operation of the steering wheel.

A power steering apparatus is broadly popular in recent years having a structure in which an actuator for assisting steering operation such as a hydraulic cylinder and an electric motor is provided in the middle of the steering mechanism, and this actuator is driven on the basis of a detected value for a steering force applied to the steering wheel for steering. Operation of the steering mechanism corresponding to the rotation of the steering wheel is assisted by an output of the actuator, whereby labor of the driver necessary for the steering is reduced.

However, since the steering wheel and steering mechanism are mechanically connected to each other in such conventional steering apparatuses, whether it has the power steering apparatus or not, the position at which the steering wheel is provided in the vehicle chamber is limited so that the freedom of layout for the interior of the vehicle chamber is restricted. Moreover, for realizing the connection, connecting members of large volume are required so that the vehicle cannot be made light.

In order to solve such problems, there has been proposed a separated type steering apparatus wherein a steering wheel, which is employed as the steering operating means, is provided but is not mechanically connected to the steering mechanism, and an actuator for steering is provided within the steering mechanism similar to the actuator for assisting the steering in the power steering apparatus. This actuator for steering is operated on the basis of detected values of the operating direction and the operating amount of the steering operating means, and steering force is applied to the steering mechanism, whereby steering is performed in correspondence to the operation of the steering operating means. Here, an electric motor (steering motor) is generally used as the actuator for steering for ease of control of changing steering characteristic in accordance with driving conditions.

Such a separated type steering apparatus not only presents an advantage in that it can solve the above problems but also in that it increases freedom of design in its arrangement, because it can flexibly meet changes in steering characteristics corresponding to driving conditions of the vehicle such as high/low vehicle speed, turning degree or presence/absence of acceleration/deceleration, and also enables the employment of suitable steering operating means such as levers, handgrips or pedals with no mechanical limit in correspondence between the operating amounts of the steering operating means and the steering actuator.

This apparatus has many further advantages which cannot be realized in a steering apparatus wherein the steering operating means and the steering mechanism are mechanically connected with each other. The apparatus has a concrete advantage in that it can be easily applied to automatic driving systems such as ITS (Intelligent Transport Systems) or AHS (Automated Highway Systems) which have been developed in recent years. Thus, this apparatus is focused as being useful in development of automobile techniques.

While such a separated type steering apparatus offers many advantages as above-described, it also presents a problem in that the driver cannot feel in the steering mechanism a reaction force of the road surface which is fed back from the steering mechanism in accordance with the steering, since the steering operating means is separated from the steering mechanism. In order to cope with this problem, there is conventionally provided with reaction force applying means which is attached to the steering operating means to apply a force to the steering operating means which is opposite to the operating direction and to enable steering operation, while making the driver feel as if the steering operating means and the steering mechanism were mechanically connected with each other.

Since the reaction force of the road surface varies in accordance with the running condition such as vehicle speed (high/low), size of steering angle (large/small) or road surface condition, an electric motor (reaction force motor) is generally used as the reaction force applying means similar to the actuator for steering operation, taking into account the degree of reaction force control according to running conditions.

The reaction force applying means employing the reaction force motor sends an output of the reaction force motor (reaction force torque) to the steering operating means through a suitable linkage mechanism such as a gear mechanism. Control of reaction force is performed by identifying reaction force actually applied to the steering mechanism (actual reaction force) and obtaining a target value for the reaction force torque based on this reaction force, or alternatively, after correcting this reaction force in accordance with running conditions, whereby the driving of the reaction force motor is controlled to output this target value.

In controlling the reaction force as explained above, it is a prerequisite to obtain a correct actual reaction force. Taking a rack-and-pinion type steering apparatus as an example, a reaction force sensor for detecting the actual reaction force may be structured so as to comprise a distortion gauge affixed to a tie rod connecting the knuckle arm and rack shaft, and an axial force acting on the tie rod is detected by utilizing distortion as the medium. Actual reaction force may be similarly detected by utilizing distortion of the affixed portion as the medium in other types of steering apparatuses by means of a distortion gauge affixed to a suitable member within the steering mechanism.

However, the steering mechanism is arranged in a manner so as to extend from the interior of the engine compartment to steerable wheels for steering on either side, and this position is a rather hard environment in terms of detecting distortion by means of a distortion gauge, so that the obtained value for the actual reaction force lacks reliability. If control of reaction force is performed on the basis of this detected value, it may be that the desired feeling for the steering operation cannot be obtained.

Japanese Patent Application Laid-Open No. 4-133861 (1992) discloses a method wherein a target value for a reaction force torque is determined by detecting an operating position (steering operating angle) of a steering operating means, and respective gains are multiplied to the steering operating angle, a steering operating angle speed and a steering operating angle acceleration in order to apply a reaction force which basically becomes large in accordance with the increase of the steering operating angle. Although detection of the actual reaction force which may lack reliability is not required in such a method, it presents a drawback in that variations in road surface conditions such as road surface friction (high/low) cannot be transmitted to the driver since the condition of the steering mechanism which is mechanically separated from the steering operating means cannot be reflected in the target value for the reaction force torque.

Japanese Patent Application Laid-Open No. 7-186983 (1995) discloses a method wherein a target value for a reaction force torque is obtained by calculating a slip angle of steerable wheels for steering on the basis of detected values for the steering operating angle and the vehicle speed, weighting a reaction force torque obtained from the calculated value and the detected values in accordance with the slip angle, and estimating a friction force for the steerable wheels for steering from the detected value for the vehicle speed. This method presents drawbacks in that the coincidence accuracy of the estimated values for the friction force based on the vehicle speed only and of the actual friction force is uncertain, and that it is required to maintain a plurality of databases including a table for the weighting whereby the structure for the control system is complicated. It also presents the drawback that the condition of the steering mechanism is not sufficiently reflected in obtaining a target value for the reaction force torque, similar to the method disclosed in Japanese Patent Application Laid-Open No. 4-133861 (1992).

BRIEF SUMMARY OF THE INVENTION

The present invention has been devised to solve the above problems. It is a purpose of the present invention to provide a separated type steering apparatus capable of determining a target value for a reaction force which accurately corresponds to an actual reaction force without detecting the same in the steering mechanism, and capable of applying a proper reaction force to a steering operating means which is not mechanically connected to the steering mechanism by controlling the reaction force on the basis of the target value whereby a favorable feel for steering can be obtained.

The steering apparatus for a vehicle according to the present invention is characterized in that it comprises a calculating means for calculating a target value for a reaction force on the basis of a self-aligning torque term which is based on a detected value for vehicle speed and a detected value for an actual position of a steering mechanism, an elastic resistance torque term which is proportional to a deviation between a detected value for a steering operating angle of a steering operating means which is not mechanically connected to the steering mechanism and the detected value for the actual position, and an inertial resistance torque term which is proportional to a time varying amount of the deviation, wherein a reaction force motor is driven on the basis of the target value for controlling the reaction force of the steering operating means.

Considering the developmental mechanism of a reaction force which is actually generated in the steering mechanism, it is noted that the main items for the development are (1) the self-aligning torque which is applied to the steering mechanism as a rotating torque around a kingpin shaft and which is generated in a direction in which the slip angle is made small on a road surface contacted by the steerable wheels for steering; (2) the elastic resistance generated as an aggregate of elasticity of the composing members of the steering mechanism including the steerable wheels for steering (tires) contacting the road surface; and (3) the inertial resistance due to inertia of the steering mechanism. Thus, the apparatus of the present invention obtains a target value for the reaction force including the condition of the steering mechanism by detecting the position of the steering mechanism (steering angle) in addition to the vehicle speed and the operating position of the steering operating means (steering operating angle), wherein the target value is an aggregate of the items.

The present invention is further characterized in that it comprises a turning condition sensor for detecting a turning condition of the vehicle, a means for judging a turning action of the vehicle on the basis of detected values of the turning condition sensor, a vehicle speed sensor and a steering operating angle sensor, and a correcting means for performing correction of the target value for the reaction force torque on the basis of the judgment result of the above means to increase the reaction force as approaching a cornering limit.

In the present invention, a sensor for detecting the turning condition such as a yaw rate sensor or lateral acceleration sensor is provided, and on the basis of detected values of the above turning condition, of the vehicle speed and of the steering angle, a turning action of the vehicle, that is, approaching to a cornering limit including the road surface condition is judged. In approaching the cornering limit, the target value for the reaction force obtained as described above is corrected so as to increase the reaction force applied to the steering operating means in order to prevent excessive steering operation.

The above and further objects and features of the present invention will more fully be apparent from the following detailed description with accompanying drawings.

DETAILED DESCRIPTION OF THE INVENTION

The present invention will now be explained in details with reference to the drawings showing an embodiment thereof.

Figure 1:
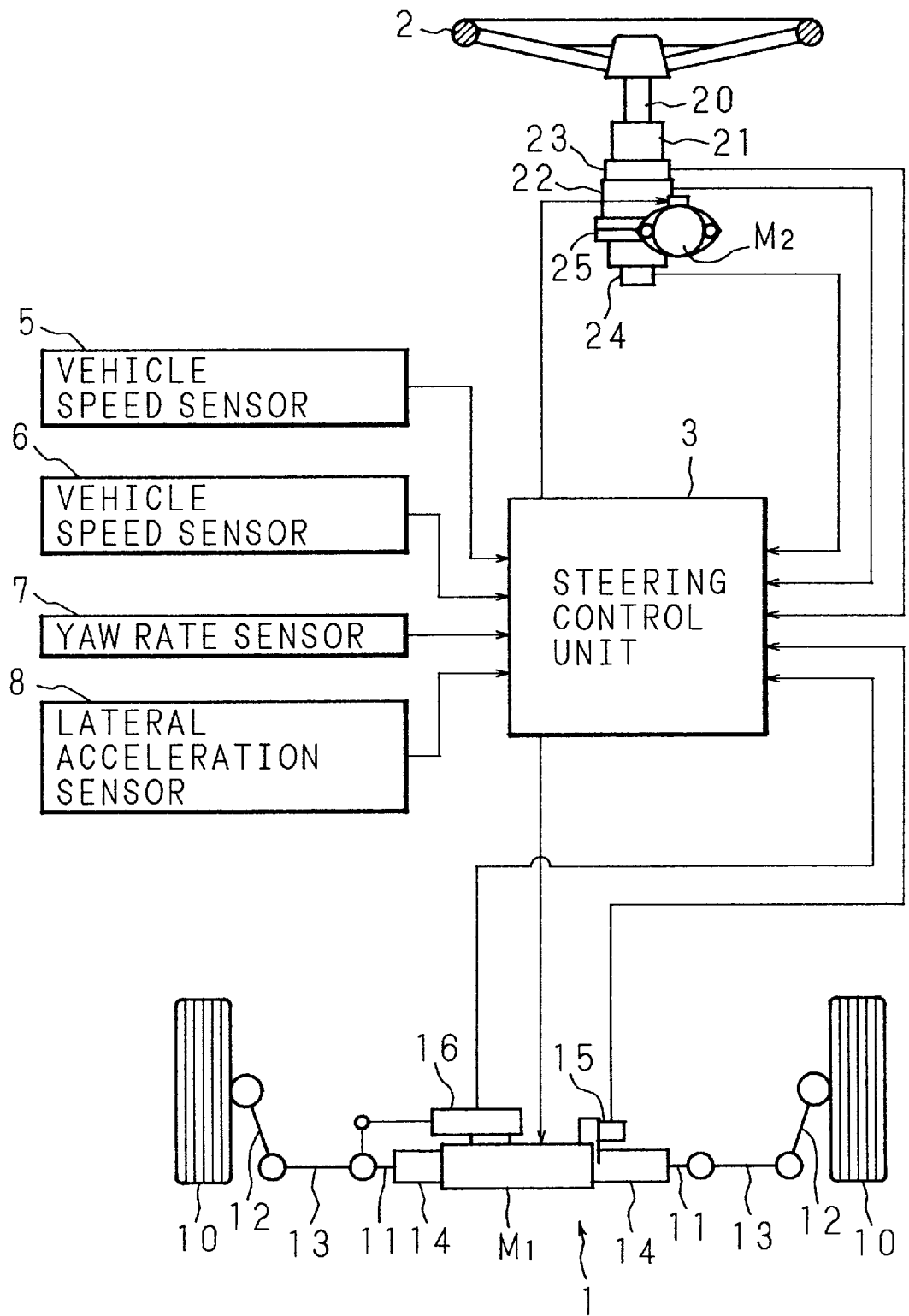
FIG. 1 is a block diagram showing an overall structure of a steering apparatus for a vehicle according to the present invention.

FIG. 1 is a block diagram showing an overall structure of a steering apparatus for a vehicle according to the present invention. The steering apparatus is made as a separated type steering apparatus comprising a steering mechanism 1 for making a pair of steerable wheels 10,1 0 provided on lateral sides of a vehicle body perform steering, a steering wheel (steering operating means) 2 which is not mechanically connected to the steering mechanism 1, and a steering control unit 3 for controlling the steering mechanism 1 act in accordance with the operation of the steering wheel 2. The steering control unit 3 includes means for calculating a target value of a reaction force torque, means for judging turning action of the vehicle, and means for correcting the target value.

The steering mechanism 1 is constituted in that both ends of a steering shaft 11, which is arranged so as to extend from side to side of the vehicle body and so as to slide in a longitudinal direction, are connected to knuckle arms 12,12 of steerable wheels 10,10 for steering through respective tie rods 13,13, and steerable wheels 10,10 may be directed to the right or left by pushing/pulling the knuckle arms 12,12 through the tie rods 13,13 by sliding of the steering shaft 11 in both directions.

In order to perform steering as explained above, the apparatus of the present invention comprises a steering motor $M_1$ integrally arranged in a middle portion of a cylindrical housing 14 for supporting the steering shaft 11 so as to be slidable in a longitudinal direction. Directing of the steerable wheels 10,10 is performed by converting the rotation of the steering motor $M_1$ into sliding movement of the steering shaft 11.

Figure 2:
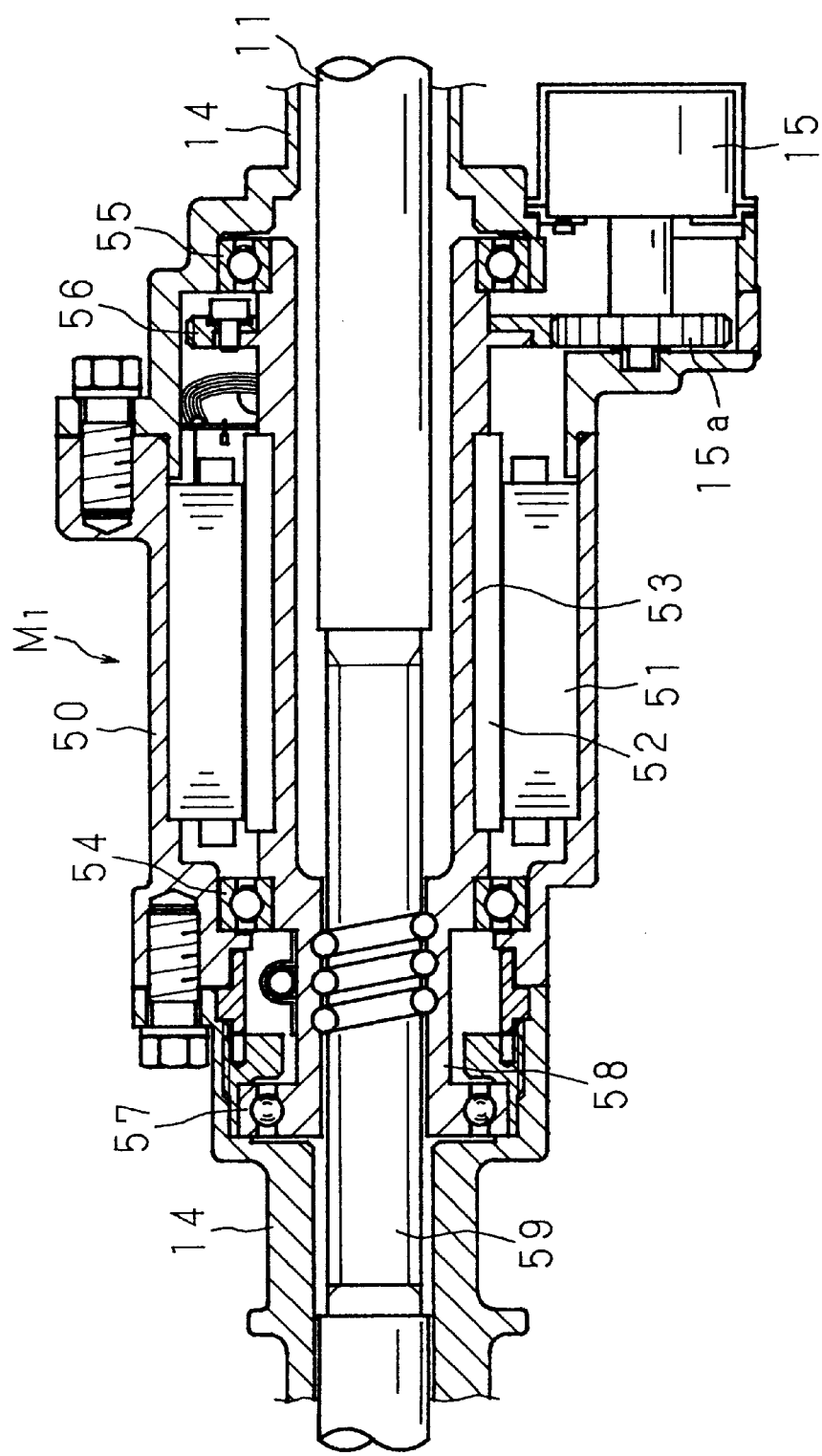
FIG. 2 is a vertical-sectional view showing an configuration of a steering motor.

FIG. 2 is a vertical-sectional view showing a structure of the steering motor $M_1$. The steering motor $M_1$ is constructed, as shown in the drawing, so as to be a three-phase brushless motor comprising a stator 51 provided on an inner surface of a motor housing 50 integrally arranged in the middle portion of the housing 14 for supporting the steering shaft 11 in a slidable manner in a longitudinal axial direction, and a rotor 52 arranged to be oppositely facing the stator 51 with a slight space formed therebetween.

The rotor 52 is integrally formed with a rotor cylinder 53 of a cylindrical shape having an inner diameter which is greater than an outer diameter of the steering shaft 11. These are supported by ball bearings 54, 55 inwardly fitted and fixed to one side of the motor housing 50 and to the housing 14 connected to the other side of the motor housing 50, respectively, as to be freely rotatable in a coaxial manner inside the stator 51. The rotor 52 and the rotor cylinder 53 can be rotated together by applying current to the stator 51 in accordance with a motion instruction signal sent from the steering control unit 3.

At an outer periphery of one side of the rotor cylinder 53 (the supporting portion of the ball bearing 55), there is attached a gear 56. The gear 56 engages with an input gear 15a of a rotation angle sensor 15 employing a rotary encoder fixedly arranged outside a corresponding portion of the housing 14, and obtains a rotating position of the rotor 52 integrally rotating with the rotor cylinder 53 as an output of the rotating angle sensor 15. It should be noted that the composition of the rotation angle sensor 15 is not limited to this, and it may alternatively be constituted in that a magneto-electric type pickup may be provided as to face an outer periphery of the gear 56, and the rotating position may be obtained by detecting cogs of the gear 56 by the pickup and calculating the number of cogs.

The other side of the rotor cylinder 53 is extended beyond the supporting portion by the ball bearing 54 and is supported within the housing 14 by a ball bearing 57 integrally formed at the extended end at the same side. Between the supporting portions by the ball bearings 54, 57, there is formed a ball nut 58 having a track for a ball screw formed at an inner surface thereof. A ball screw portion 59 is formed in a middle portion of the steering shaft 11, which has a track for a ball screw on its outer surface at a specified length, and a ball screw mechanism is composed by screwing the ball screw portion 59 into the ball nut 58 through many balls.

Rotating of the steering shaft 11 around its axis is restricted by means of a rotation restriction means interposed between the steering shaft 11 and its housing 14. The rotation of the steering motor $M_1$, that is, the rotation of the rotor 52 performed by applying current to the stator 51, is directly converted into sliding of the steering shaft 11 in a longitudinal direction by the screwing of the ball nut 58 formed in connection to one side of the rotor cylinder 53 and the ball screw portion 59 integrally formed with the steering shaft 11. Steering (directing of steerable wheels 10,10 for steering) is performed in accordance with the rotation of the steering motor $M_1$ in this manner. The steering motor $M_1$ is arranged without occupying a large space around the steering shaft 11 including a motion converting mechanism for converting its rotation into sliding movement of the steering shaft 11.

A moving instruction from the steering control unit 3 is sent to the steering motor $M_1$ through a driving circuit whereby the steering motor $M_1$ is driven following the moving instruction. The actual moved position of the steering mechanism 1 which moves in accordance with this driving is detected by a tie rod displacement sensor 16 for detecting a displacement of a connecting portion between the steering shaft 11 and one tie rod 13, and this position is sent to the steering control unit 3 as a signal indicating the actual steering angle $\theta_2$ of the steerable wheels for steering 10,10.

As simply shown in FIG. 1, the tie rod displacement sensor 16 is provided with a detecting cylinder interposed between the connecting portion of the steering shaft 11 and the tie rod 13 and the outer surface of the housing 14, and detects a desired displacement amount by using the advancing/retracting amount of the detecting cylinder. While a single tie rod displacement sensor 16 is attached to the one tie rod 13 in the drawing, it is desirable to provide a plurality of tie rod displacement sensors at the tie rod(s) 13 at either or both sides to cope with situations in which any of the sensors is out of order, since it is important to detect the actual moved position of the steering mechanism 1 for the operation of the apparatus according to the present invention as will be described later.

As schematically shown in FIG. 1, the steering wheel 2 which is not mechanically connected to the steering mechanism 1 which performs the above-described steering is supported at a suitable portion of the vehicle body through a column housing 21 which holds a column shaft 20 that functions as a rotating shaft thereof in a rotatable manner. At the outer surface of the column housing 21, there is provided a reaction force motor (DC motor) $M_2$ in a manner that their axes cross.

Figure 3:
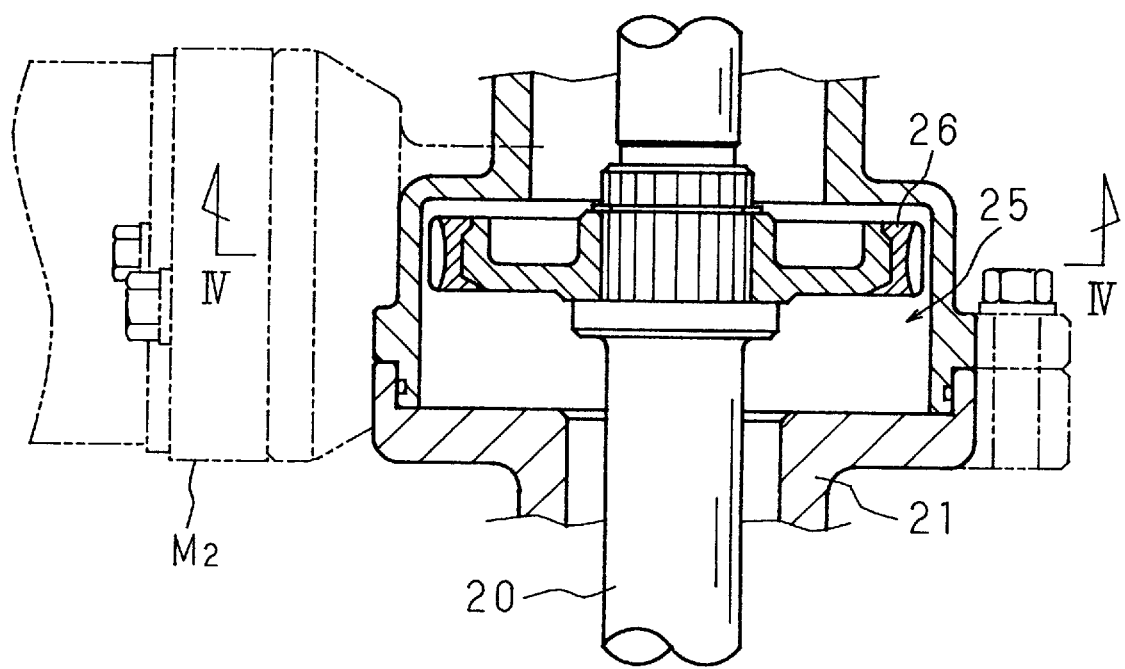
FIG. 3 is a vertical-sectional view showing a proximity of an arranging position of a reaction force motor.
Figure 4:
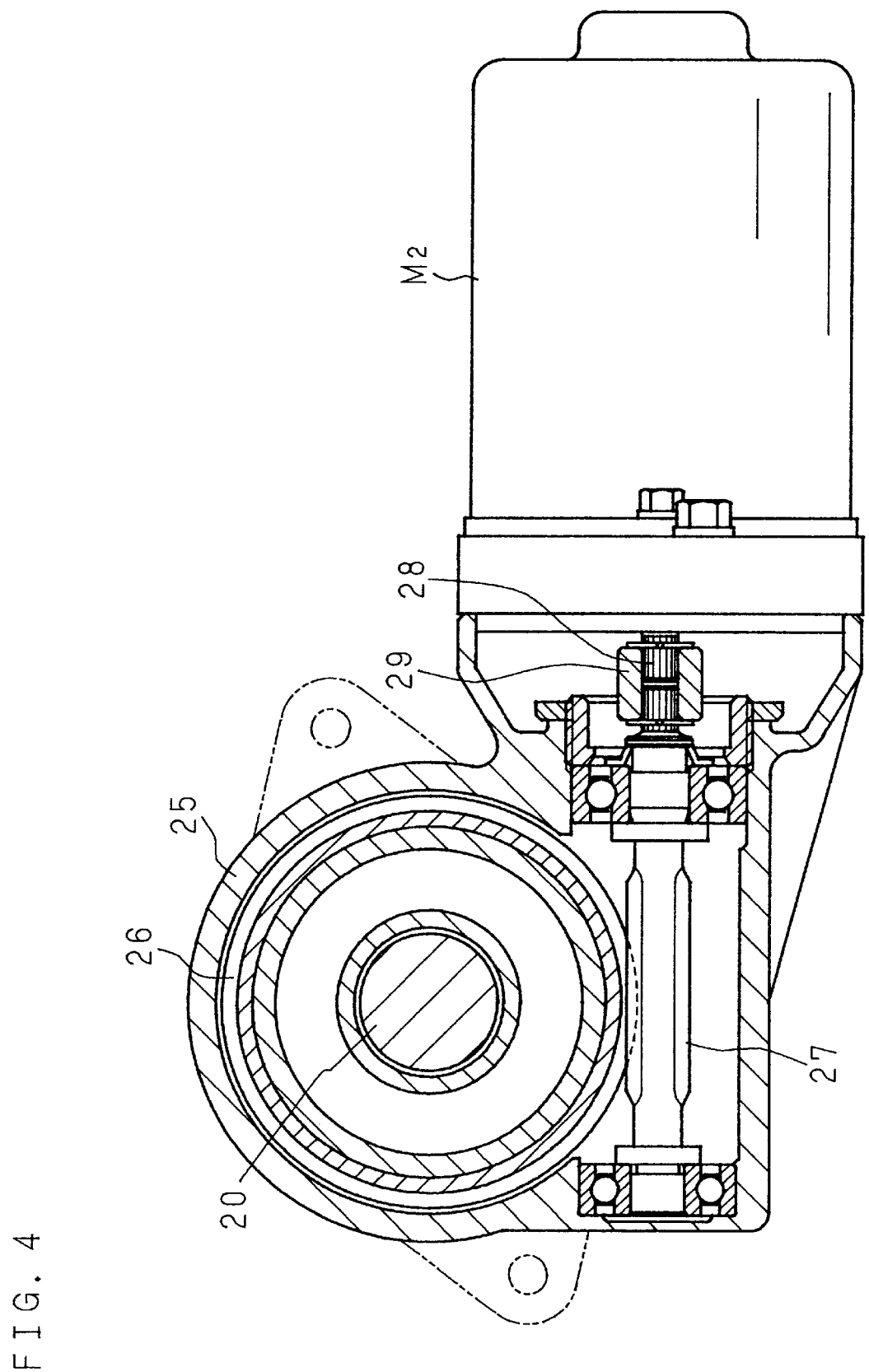
FIG. 4 is a transverse cross-sectional view along line IV—IV in FIG. 3.

FIG. 3 is a vertical-sectional view of a proximity of an attaching position of the reaction force motor $M_2$, and FIG.

4 is a horizontal cross-sectional view along line IV—IV of FIG. 3. In a middle portion of the column shaft 20, a worm wheel 26 is coaxially fitted and fixed within a gear chamber 25 formed by partially enlarging the diameter of the column housing 21, and a worm 27 engages with the worm wheel 26 at a suitable position on its outer periphery. The reaction force motor $M_2$ is fixed at the outside of the gear chamber 25, and the tip of an output shaft 28 thereof which is inserted into the gear chamber 25 is coaxially connected to a base portion of the worm 27 through a sleeve-like joint 29.

When the reaction force motor $M_2$ rotates, the worm 27 rotates around its axis, and the rotation is transmitted to the column shaft 20 through the worm wheel 26, whereby reaction force torque corresponding to the output of the reaction force motor $M_2$ is applied to the steering wheel 2 attached to an upper end of the column shaft 20. Such application of reaction force torque is performed in order to feedback the reaction force applied to the steering mechanism 1 to the steering wheel 2 accompanying the steering, and to let the driver feel the reaction force. For the purpose, the moving instruction from the steering control unit 3 is sent to the reaction force motor $M_2$ through the driving circuit, so that it is driven to apply a reaction force torque which is opposite to the operating direction of the steering wheel 2 to the steering wheel 2 upon receipt of this moving instruction.

Therefore, in order to perform rotating operation of the steering wheel 2, a steering torque needs to be applied against the reaction force torque generated by the reaction force motor $M_2$. The steering torque applied to the steering wheel 2 is detected a torque sensor 22 provided so as to be attached in a middle portion of the column housing 21. The operating amount of the steering wheel 2, including the operating direction, is detected by a pair of steering operating angle sensors 23,24 arranged on both sides of the reaction force motor $M_2$. These detected values are sent to the steering control unit 3 as signals for indicating the operating condition of the steering wheel 2.

The steering operating angle of the steering wheel 2 which is given as detected values of the steering angle sensors 23,24 are important values used for obtaining the target value for the steering force which is to be generated by the steering motor $M_1$ on the basis of deviation between the two values along with the actual moved position of the steering mechanism 1 detected by the tie rod displacement sensor 16 in the steering control unit 3. A pair of steering angle sensors 23,24 are provided in this embodiment for the purpose of preventing control performance based on erroneous detected values in case any of the sensors is out of order. In normal conditions, a detected value obtained by the one steering angle sensor 23 is used, and the other steering angle sensor 24 is used as a fail-safe sensor when the normally used steering angle sensor 23 is broken. It should be noted that the steering torque detected by the torque sensor 22 is used for judgement of a breakdown of the reaction force motor $M_2$ as a feedback signal of reaction force generated by the reaction force motor $M_2$.

The column shaft 20 for supporting the steering wheel 2 is energized by means of a centering spring arranged within the column housing 21 and when the rotating operation of the steering wheel 2 is terminated, the steering wheel 2 is returned to a neutral position by the spring force of the centering spring acting on the column shaft 20. This returning is important for returning the steering wheel 2 in accordance with the returning of the steerable wheels 10,10 to a straight running direction performed in the steering mechanism 1.

The actual steering condition in the steering mechanism 1 is sent to the steering control unit 3 as an input of the rotating angle sensor 15 and the tie rod displacement sensor 16, and the operating condition of the steering wheel 2 which is employed as the steering operation means is sent to the steering control unit 3 as an input of the torque sensor 22 and the steering angle sensors 23,24. In addition to these, outputs of vehicle speed sensors 5,6 for detecting the running speed of the vehicle, an output of a yaw rate sensor 7 for detecting a yaw rate of the vehicle, and an output of a lateral acceleration sensor 8 for detecting a lateral acceleration of the vehicle are respectively sent to the input side of the steering control unit 3.

The vehicle speed sensors 5,6 may be, for example, rotating speed sensors for detecting a rotating speed of front or rear steerable wheels corresponding to the vehicle speed. A pair of vehicle speed sensors are provided for use as a fail-safe sensor in case any is out of order, similarly to the tie rod displacement sensor 16 and the steering angle sensors 23,24. Similarly, the yaw rate sensor 7 and the lateral acceleration sensor 8 are both provided for detecting a turning condition of the vehicle so that one of them may be used as a fail-safe sensor in case the other is out of order. In normal conditions, the output of the yaw rate sensor 7 is used as a signal for indicating the turning condition.

The outputs of the steering control unit 3 are sent to the steering motor $M_1$ for making the steering mechanism 1 perform steering and to the reaction force motor $M_2$ for applying reaction force torque to the steering wheel 2 through respective driving circuits. The steering motor $M_1$ and the reaction force motor $M_2$ are respectively driven in accordance with moving instructions of the steering control unit 3.

In control of the steering motor $M_1$ by the steering control unit 3 a steering operating angle which indicates the operating amount of the steering wheel 2 is identified from the input of the steering operating angle sensor 23, and this steering operating angle is corrected in accordance with the vehicle speed (high/low) detected by the vehicle speed sensors 5,6 and the turning condition detected by the yaw rate sensor 7 or lateral acceleration sensor 8, whereby a target steering angle which is to be performed by the steering mechanism 1 is obtained. On the other hand, the steering motor $M_1$ is driven by following steps: an actual steering angle generated in the steering mechanism 1 is identified through an input of the tie rod displacement sensor 16; a target value for the output of the steering motor $M_1$ is obtained by PID calculation based on a deviation between the actual steering angle and the target or lateral acceleration sensor 8, whereby a target steering angle which is to be performed by the steering mechanism 1 is obtained. On the other hand, the steering motor $M_1$ is driven by following steps: an actual steering angle generated in the steering mechanism 1 is identified through an input of the tie rod displacement sensor 16; a target value for the output of the steering motor $M_1$ is obtained by PID calculation based on a deviation between the actual steering angle and the target steering angle; and moving instruction in accordance with the target value is sent to the steering motor $M_1$.

In this control, correction of the target steering angle in accordance with the vehicle speed and turning condition is respectively performed so as to decrease the target steering angle as the vehicle speed and the turning degree increases. Consequently, a sudden turning motion at the time of high speed running can be restrained and the steering operation force at the time of low speed running can be reduced. The input from the rotating angle sensor 15, which is provided as to be attached to the steering motor $M_1$, to the steering control unit 3 is used to identify the rotating position of the steering motor $M_1$ when the above-described moving instruction is output, and to perform phase adjustment of driving current supplied to the steering motor $M_1$.

While performing control of the steering motor $M_1$ as described, the steering control unit 3 controls the reaction force motor $M_2$ by applying reaction force applied to the steering mechanism 1 accompanying the steering also to the steering wheel 2 so as to make the driver feel it.

In this control, the reaction force actually generated in the steering mechanism 1 accompanying the steering is estimated by using the steering operating angle of the steering wheel 2 detected by the steering angle sensor 23 (or steering angle sensor 24), the actual moved position X of the steering mechanism 1 (tie rod displacement) detected by the tie rod displacement sensor 16 and vehicle speed v detected by the vehicle speed sensor 5 (or vehicle speed sensor 6) and then the target value for the reaction force torque is obtained. The reaction force motor $M_2$ is driven by judging the turning action of the vehicle on the basis of the detected value for the turning condition detected by the yaw rate sensor 7 (or lateral acceleration sensor 8), the actual moved position X of the steering mechanism 1 and the vehicle speed v, correcting the target value on the basis of this judgement, and sending moving instruction to the reaction force motor $M_2$ for obtaining a corrected target value for the reaction force torque.

Figure 5:
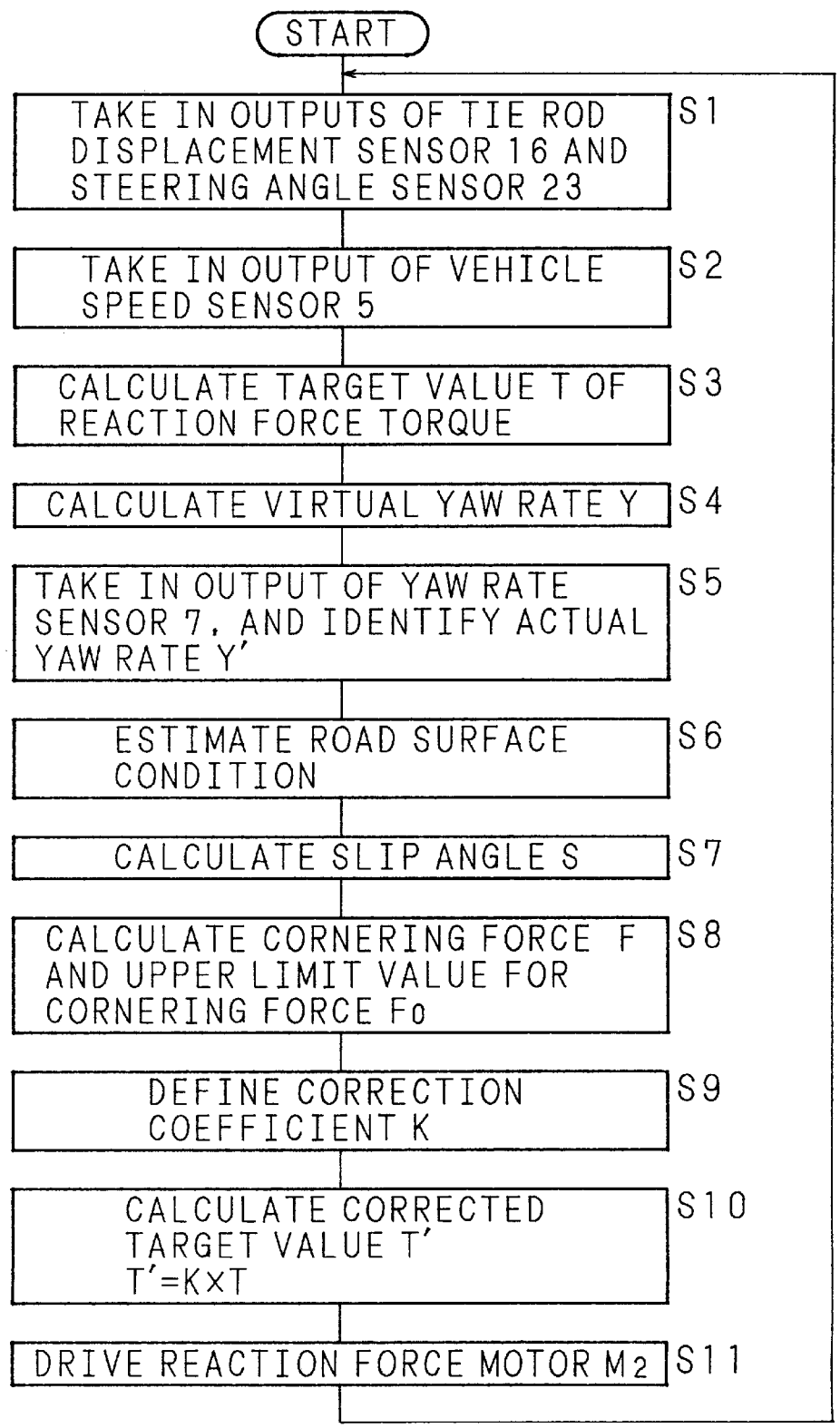
FIG. 5 is a flowchart showing procedure of reaction force control.

FIG. 5 is a flowchart showing the procedure for the reaction force control. The steering mechanism 3 starts moving when a key switch for starting the engine is turned ON, and [takes in] receives an output of the tie rod displacement sensor 16 connected to the input side thereof and an output of the steering angle sensor 23 (or steering angle sensor 24) connected to the input side thereof (Step S1) to identify the tie rod displacement X from the former and a steering operating angle δ of the steering wheel 2 from the latter. Then, an output of the vehicle speed sensor 5 (or vehicle speed sensor 6) is taken in (Step S2) to identify an existing vehicle speed v.

Next, the steering control unit 3 calculates the target value for the reaction force torque T by applying the steering operating angle , the tie rod displacement X, and the vehicle speed v to the equation below (Step S3).

$$T=G(v)\cdot X+C(\delta-nX)+I\cdot d(\delta-nX)/dt[\ldots] \quad (1)$$

Figure 6:
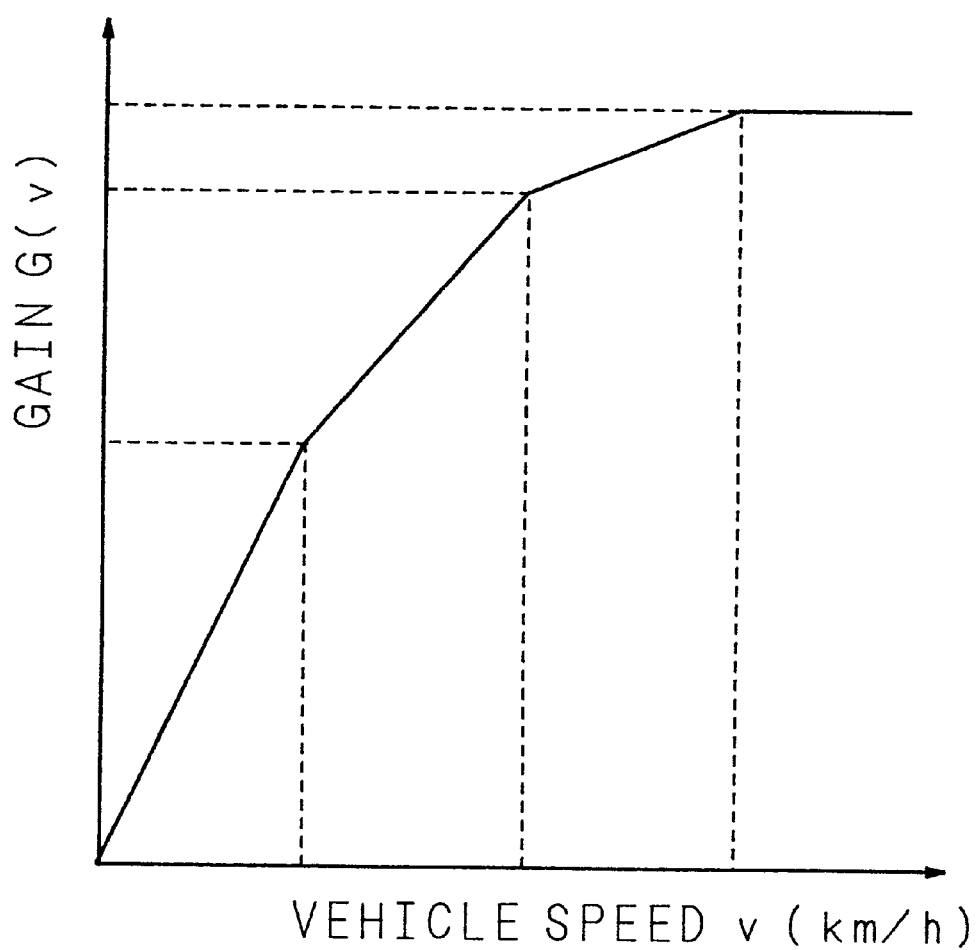
FIG. 6 is a diagram showing an example for vehicle speed gain.

The first term of equation (1) is a self-aligning torque term. This is a component of the reaction force applied to the steering mechanism 1 as a rotating torque around a kingpin shaft employed as a pivot-supporting axis of the knuckle arms 12,12, the component being generated on the ground contacting surface of the steerable wheels for steering (steerable wheels 10,10) contacting the road in a direction in which the slip angle is made small through caster effect. This reaction force component is given as a product of gain G(v) determined in relation with the vehicle speed v multiplied by the tie rod displacement X indicating the actual moved position of the steering mechanism 1. The gain G(v) may have a characteristic which increases nonlinearly in accordance with the increase in vehicle speed v by depending on the vehicle speed v only, and may be set on a gain table as shown in FIG. 6.

The second term of equation (1) is an elastic resistance term. This indicates a component of the reaction force generated as an aggregate of elasticity owned by each of the composing members of the steering mechanism 1 (steering shaft 11, knuckle arms 12,12, tie rods 13,13, and so on) including the steerable wheels 10,10 contacting the road surface, and is obtained as a value which is proportional to a deviation between the steering operating angle δ and the tie rod displacement X.

The third term of equation (1) is an inertial resistance term. This expresses a component of the reaction force generated by an inertial influence of the steering mechanism 1 and is obtained as a value which is proportional to a time differential value of a deviation between the steering operating angle δ and the tie rod displacement X. It should be noted that "C" of the second term and "I" of the third term represent proportional gains, and "n" in the second and third term are multiplier for making the tie rod displacement X correspond to the steering operating angle δ which corresponds to a gear ratio in a general steering mechanism.

In such an apparatus according to the present invention, the target value T for the reaction force torque to be generated by the reaction force motor $M_2$ is calculated by equation (1) without use of detected values for the actual reaction force in the steering mechanism 1, and the reliability of this target value is of no question. Further, since equation(1) includes the tie rod displacement X which indicates the actual moved position of the steering mechanism 1 as well as the vehicle speed v, the target value T reflects the condition of the steering mechanism 1 to accurately correspond to the actual reaction force. Also, since calculation of the target value T by using equation (1) can be easily performed by applying each of the detected values for the steering operating angle δ, the tie rod displacement X and the vehicle speed v, there is almost no need for the steering control unit 3 to be of complicated constitution.

After calculating the target value T for the reaction force torque, the steering control unit 3 calculates a virtual yaw rate Y in an estimating manner by applying the vehicle speed (v) and the steering operating angle δ to a known estimating equation using a vehicle model (Step S4). Then, an output of the yaw rate sensor 7 is taken in to identify the existing actual yaw rate Y' (Step S5). A deviation between the actual yaw rate Y' and the virtual yaw rate Y is obtained, and on the basis of this value, the condition of the road surface on which the vehicle runs (friction coefficient of the road surface) is estimated (Step S6).

An existing slip angle S of the steerable wheels 10,10 is calculated by applying the vehicle speed v and the steering operating angle δ to a specified equation (Step S7) and an existing cornering force F and an upper limit value for the cornering force $F_0$ under the same conditions are calculated on the basis of the obtained slip angle S and the friction coefficient (Step S8). Then, by setting, for instance, a deviation between the two values ($F_0$–F) as a reference for judging the turning action, a correction coefficient K which increases as [decreasing of] this value decreases, that is, as approaching the cornering limit is defined (Step S9), and a corrected target value T' for the reaction force torque is obtained by multiplying the correction coefficient K [to] with the target value T (Step 10). By outputting a moving instruction in accordance with this corrected target value T' to the reaction force motor $M_2$, the reaction force motor $M_2$ is driven (Step S11).

Figure 7:
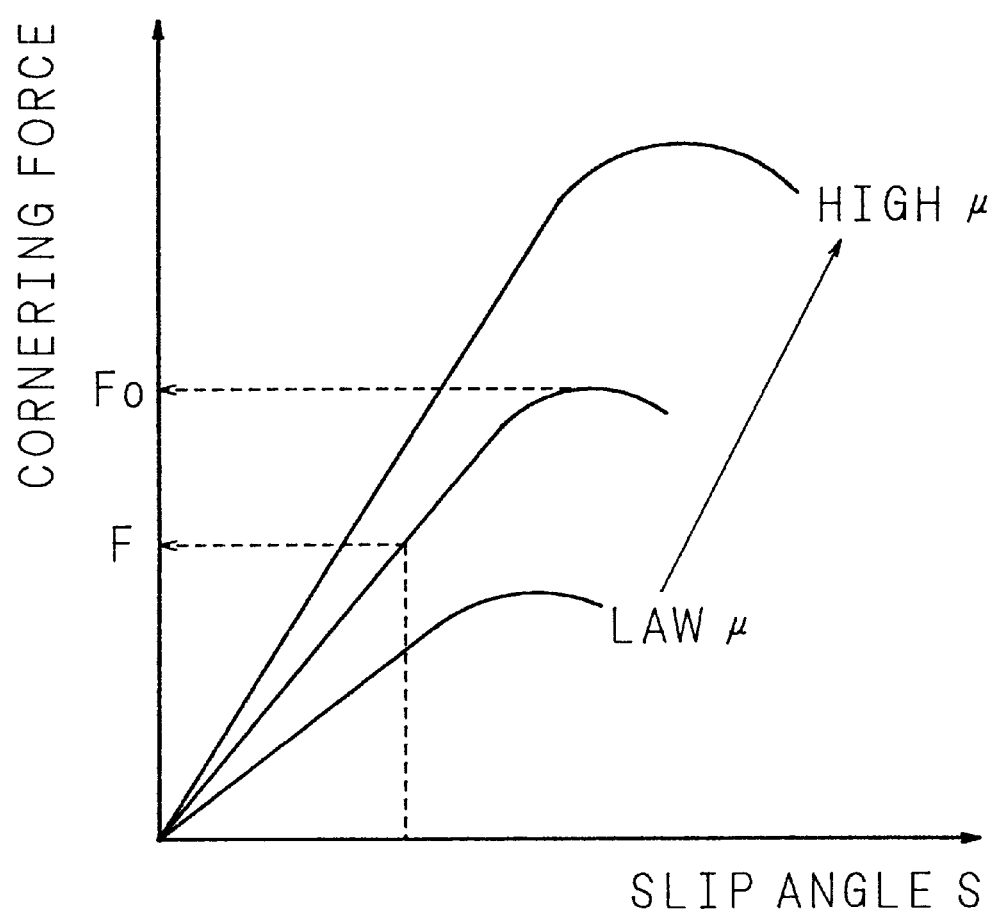
FIG. 7 is a graph showing the relationship between a slip angle and a road surface friction coefficient and cornering force.

As shown in FIG. 7, the cornering force F is given as a value which increases accompanying the increase in the slip angle S until a specified slip angle S is reached at a variation ratio in which it becomes large/small in accordance with a large/small friction coefficient of the road surface $\mu$, and tends to decrease after the specified slip angle S is reached. This inflection point to decreasing is the upper limit $F_0$ indicating the cornering limit point, and specifying of the cornering force F and the upper limit value $F_0$ in Step S8 is realized by applying estimated values for the slip angle S and the friction coefficient $\mu$ to a table as shown in FIG. 7.

The target value T for the reaction force torque obtained by equation (1) is corrected to be increased as approaching the cornering limit with judging the turning action of the vehicle, and more particularly, the degree of approaching to the cornering limit in the procedure of Step S4 to Step S9. Therefore, operation of the steering wheel 2 which exceeds the cornering limit is substantially made impossible.

It should be noted that the correction coefficient K may be a coefficient which increases in a suitable manner accompanying the decrease of deviation ($F_0-F$). And it is desirable that it is a coefficient which is small until the deviation ($F_0-F$) reaches a specified lower limit and which is suddenly made great as soon as the lower limit is exceeded, and whereby no great reaction force is applied at normal turning.

By means of the reaction force control as explained above, the steering wheel 2 is made heavy in accordance with an increase in vehicle speed and is made light in accordance with a decrease in vehicle speed, so that both, improved stability in straight ahead driving at high speed running of the vehicle as well as reduction of steering force at low speed running or stop of the vehicle may be achieved. By the to Step S9, judgement of the turning action of the vehicle, and more particularly, judgement of the degree of approach[ing] to the cornering limit is made so that the target value T for the reaction force torque obtained by equation (1) is corrected to be increased as [approaching] the cornering limit is approached. Consequently, the steering wheel 2 is made heavy [with decreasing of] as the friction coefficient of the road surface decreases and increasing of the turning degree, and it can be restrained from [operation] operating so as to exceed the cornering limit.

In the above-described apparatus according to the present invention, from the viewpoint of the generating mechanism of reaction force actually generated in the steering mechanism, the target value for the reaction force torque is calculated by the equation containing the self-aligning torque term based on the vehicle speed and the actual moved position of the steering mechanism, the elastic resistance torque term which is proportional to the deviation between the steering operating angle of the steering operating means and the actual moved position of the steering mechanism, and the inertial resistance torque term which is proportional to the time variation of the deviation. Therefore, actual reaction force generated in the steering mechanism can be accurately imitated without detecting the actual reaction force in the steering mechanism, and a suitable reaction force may be applied to the steering operating means which is not mechanically connected to the steering mechanism in order to obtain favorable steering feeling.

Further, since the turning action is judged on the basis of detected values for the turning condition, the vehicle speed and the steering operating angle, and the target value for the reaction force torque is corrected to [be] increase[d] as [approaching] the cornering limit is approached, excessive operation of the steering operating means in an emergency can be prevented.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A steering apparatus for a vehicle comprising:
   a steering operating means;
   a steering mechanism which is not mechanically connected to the steering operating means;
   a vehicle speed sensor detecting vehicle speed;
   a steering angle sensor detecting a moved position of the steering operating means;
   a moved position sensor detecting an actual moved position of the steering mechanism;
   a reaction force motor applying a reaction force torque to the steering operating means; and
   a processor calculating a target value for the reaction force torque on the basis of (a) a self-aligning torque term based on a detected value of the vehicle speed sensor and a detected value of the moved position sensor, (b) an elastic resistance torque term which is proportional to a deviation between a detected value of the steering angle sensor and a detected value of the moved position sensor, and (c) an inertial resistance torque term which is proportional to a time varying amount of the deviation,
   whereby the application of the reaction force to the steering operating means is controlled by driving the reaction force motor on the basis of the calculated target value.

2. The steering apparatus for a vehicle according to claim 1, further comprising:
   a turning condition sensor detecting a turning condition of the vehicle;
   a controller judging a turning action of the vehicle and producing a judgment result signal, on the basis of detected values of the turning condition sensor, the vehicle speed sensor and the steering angle sensor; and
   a corrector correcting the target value for the reaction force torque on the basis of the judgment result signal by increasing the target value when approaching a cornering limit.

3. The steering apparatus according to claim 2, wherein the turning condition sensor is at least one of a yaw rate sensor and a lateral acceleration sensor.

* * * * *